(12) United States Patent
Pressley, Jr. et al.

(10) Patent No.: US 6,822,855 B2
(45) Date of Patent: Nov. 23, 2004

(54) LOCALLY ISOLATED RUGGEDIZED COMPUTER SYSTEM AND MONITOR

(75) Inventors: Homer M. Pressley, Jr., Madison, AL (US); Charles A. Abare, Athens, AL (US); Emanuel J. Walker, Jr., Huntsville, AL (US)

(73) Assignee: Intergraph Hardware Technologies Company, Las Vegas, NV (US)

( * ) Notice: Subject to any disclaimer, the term of this patent is extended or adjusted under 35 U.S.C. 154(b) by 0 days.

(21) Appl. No.: 10/202,404

(22) Filed: Jul. 24, 2002

(65) Prior Publication Data

US 2003/0030979 A1 Feb. 13, 2003

Related U.S. Application Data

(60) Provisional application No. 60/307,830, filed on Jul. 25, 2001.

(51) Int. Cl.[7] .................................................. G06F 1/16
(52) U.S. Cl. ........................ 361/681; 361/683; 248/562; 248/636; 248/638; 312/223.1; 312/223.2
(58) Field of Search ................................. 361/680–683, 361/695, 697; 307/9.1; 248/560–681, 917–920; 267/140–142; 348/552, 822, 825, 836; 345/169, 905; 312/223.1–223.3, 351.1–352

(56) References Cited

U.S. PATENT DOCUMENTS

| 4,429,068 | A | * | 1/1984 | Nakahira | 524/302 |
|---|---|---|---|---|---|
| 4,669,697 | A | | 6/1987 | Suzuki et al. | 248/638 |
| 5,021,763 | A | * | 6/1991 | Obear | 340/407.2 |
| 5,282,114 | A | | 1/1994 | Stone | 361/687 |
| 5,430,607 | A | * | 7/1995 | Smith | 361/683 |
| 5,479,285 | A | | 12/1995 | Burke | 359/83 |
| 5,559,671 | A | * | 9/1996 | Dan et al. | 361/682 |
| 5,570,270 | A | | 10/1996 | Naedel et al. | 361/687 |
| 5,831,816 | A | | 11/1998 | Johns et al. | 361/681 |
| 5,867,369 | A | | 2/1999 | Antonuccio et al. | 361/796 |
| 6,099,355 | A | | 8/2000 | Johnson et al. | 439/638 |
| 6,252,639 | B1 | | 6/2001 | Giannatto | 349/58 |
| 6,297,956 | B1 | * | 10/2001 | Janik et al. | 361/687 |
| 6,578,813 | B1 | * | 6/2003 | Monson et al. | 248/618 |
| 2002/0149714 | A1 | * | 10/2002 | Anderson et al. | 349/59 |

* cited by examiner

Primary Examiner—Darren Schuberg
Assistant Examiner—Anthony Q. Edwards
(74) Attorney, Agent, or Firm—Bromberg & Sunstein LLP (57) ABSTRACT

A console-type ruggedized computer system has a console with components, and an image producing apparatus for displaying images based upon electronic signals received from the components of the console. The computer system further includes at least one shock absorber coupling the image producing apparatus to the console. The (at least one) shock absorber is capable of attenuating shock to the image producing apparatus.

14 Claims, 9 Drawing Sheets

LOCALLY ISOLATED RUGGEDIZED COMPUTER SYSTEM AND MONITOR

PRIORITY

This patent application claims priority from provisional U.S. patent application No. 60/307,830, filed Jul. 25, 2001, entitled, "LOCALLY ISOLATED RUGGEDIZED COMPUTER SYSTEM," and naming Homer M. Pressley Jr, Charles A. Abare, and Emanuel J. Walker Jr. as inventors, the disclosure of which is incorporated herein, in its entirety, by reference.

FIELD OF THE INVENTION

The invention generally relates to computer systems and, more particularly, the invention relates to reducing the effects of shock to ruggedized computer system.

BACKGROUND OF THE INVENTION

Computer systems often are used in extreme environments. For example, modern warships use a variety of computer systems for tasks ranging from navigation to weapons discharge. Consequently, during a combat situation, such computer systems can be subjected to significant G-forces (e.g., between 50–100 Gs) from explosions in their local vicinity. Conventional "off the shelf" computer systems, however, cannot tolerate the impact of these forces.

The art has responded to this problem by developing "rugged" computer systems that can withstand the extreme forces commonly associated with such environments. Accordingly, due to their resilient construction, these types of computer systems are appropriately known in the art as "ruggedized" computer systems.

Many different types of ruggedized computer systems have been developed. One type, known in the art as "console-type" ruggedized computer systems (referred to herein as a "console system"), typically includes (among other things) a steel reinforced console having an interior chamber, internal electronic components within the internal chamber (e.g., processors, memory, busses, and/or extender technology for remote processing), and a cathode ray tube (CRT) monitor encased in a steel housing that is bolted to the console. If used on a warship, for example, the bottom of the chassis typically is secured to the ship's deck with both securing bolts and force isolators ("isolators," which attenuate shock to the overall computer system). The size of the isolators are selected to ensure that they are capable of attenuating the impact of large forces (e.g., up to 100 Gs) on the overall computer system, thus protecting both the internal electronic components and the monitor.

To provide this durability, currently available chassis systems often are relatively heavy and large. For example, a typical chassis system can weigh about 1,400 pounds and have a large profile. There is a need in the art, however, to reduce the weight and size of chassis systems without compromising their durability. In addition, due to known U.S. Defense Department budgetary constraints, there also is a need in the art to reduce the costs associated with producing console systems.

SUMMARY OF THE INVENTION

In accordance with one aspect of the invention, a console-type ruggedized computer system has a console with components, and an image producing apparatus for displaying images based upon electronic signals received from the components of the console. The computer system further includes at least one shock absorber coupling the image producing apparatus to the console. The (at least one) shock absorber is capable of attenuating shock to the image producing apparatus.

The components may include computer hardware that forwards the images to the image producing apparatus. For example, the computer hardware may include at least one of a processor, memory, an extender, and a bus system. The image producing apparatus may include a metallic case containing an image producing device, such as a liquid crystal display device or a cathode ray tube device. In a similar manner, the console may be metallic. The at least one shock absorber may be manufactured from a hardened rubber material.

In some embodiments, the image producing apparatus weighs no more than about 75 pounds. The image producing apparatus also may include a case forming a case interior, a monitor within the case interior, and a fan coupled with the case. The fan thus may be capable of generating air flow within the case interior to reduce the temperature within the case interior when the monitor is energized.

In accordance with another aspect of the invention, a ruggedized image producing apparatus includes a rigid case forming a case interior, a monitor mounted within the case interior, and at least one shock absorber connected to the rigid case. The (at least one) shock absorber is connectable to a structure.

In some embodiments, the structure includes one of a wall and a console. The monitor also may include a data input that is capable of receiving image data for display on the monitor. Additionally, the case interior also may contain shock absorbing material within the case interior. Various embodiments permit the monitor to be any conventional monitor, such as a liquid crystal display device or a cathode ray tube display device.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a ruggedized computer system includes an image producing apparatus that is isolated from its console. To that end, various embodiments of the ruggedized computer system include an image producing apparatus having a ruggedized case with an interior, a monitor mounted within the ruggedized case interior, and an isolator coupling the ruggedized case with the console. Details of illustrative embodiments are discussed below.

It should be noted that illustrative embodiments are discussed herein as being used on a warship. This use, however, is exemplary and should not be interpreted to limit the scope of various embodiments of the invention. For example, illustrative embodiments can be used in tanks, areas prone to earthquake, aircraft, and land-based military installation. Accordingly, those skilled in the art should appreciate that the described ruggedized computer system can be used in environments other than warships. In addition, the term "Gs" is used for describing force. When used herein, the term "G" has its well known meaning, which is the force applied to a mass as a multiple of the acceleration produced by earth's gravity (i.e., 32 feet per second per second). Accordingly, by way of example, 30 Gs is 30 times the acceleration of gravity on earth.

Figure 1:
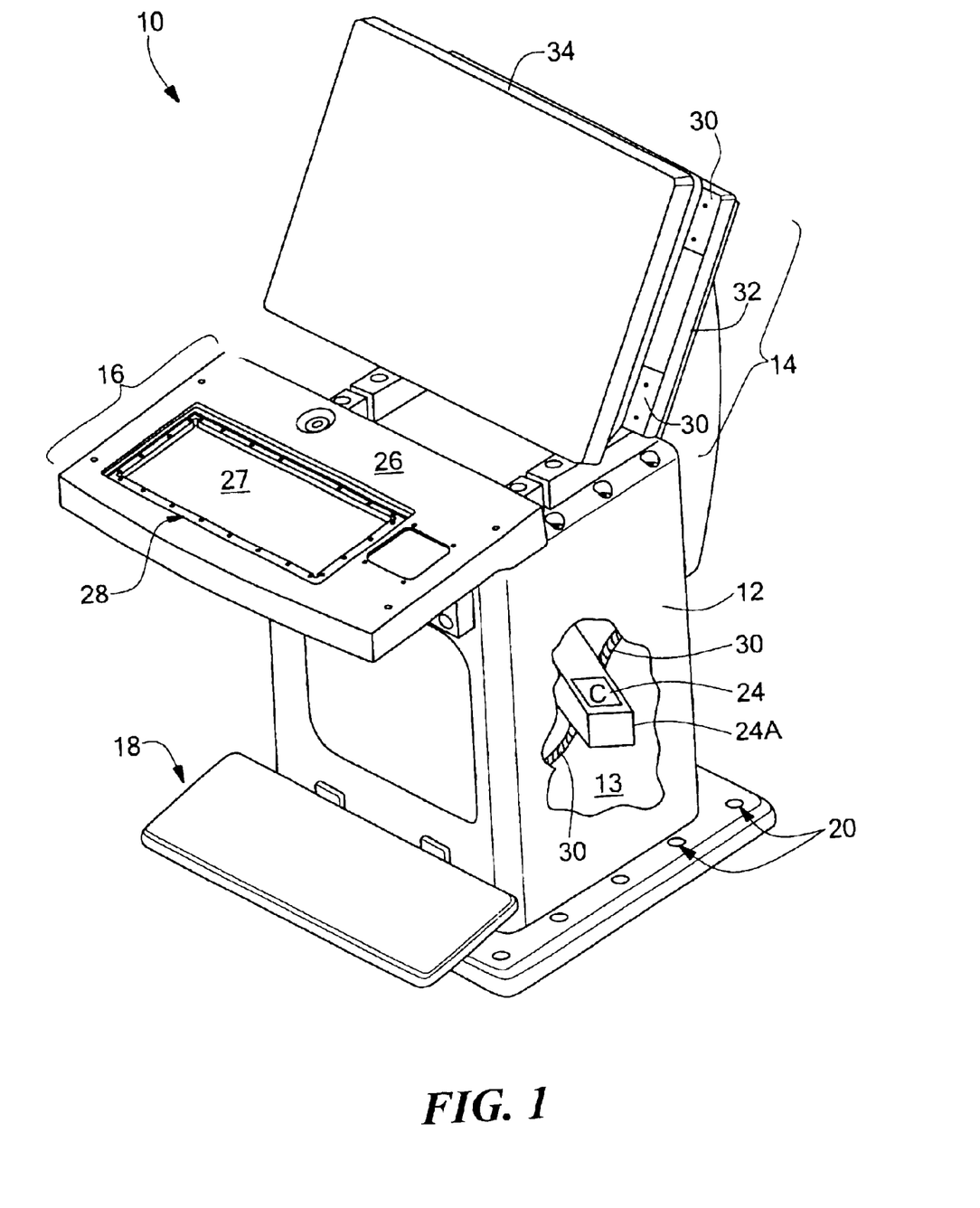
FIG. 1 shows a perspective front view of a ruggedized computer system constructed in accordance with illustrative embodiments of the invention.

FIG. 1 shows a front perspective view of a ruggedized computer system (referred to herein as "computer system 10") constructed in accordance with illustrative embodiments of the invention. More particularly, the computer system 10 includes, among other things, an aluminum reinforced console 12 having an interior, a monitor apparatus 14 (referred to above as "image producing apparatus") coupled with the console 12, a keyboard apparatus 16 coupled with the console 12, and a foot rest 18 also coupled with the console 12. The console 12 includes a plurality of bolt holes 20 for bolting the console 12 to a secure surface, such as the deck of a ship.

The console 12 includes an interior 13 for securing various computer electronic components. Electronic components are shown schematically in FIG. 1 and identified by reference number reference number 24. As known by those skilled in the art, computer electronic components 24 may include typical computer elements, such as a processor, a bus architecture, random access memory for volatile data storage, disk drives for nonvolatile data storage, connectors for connecting to peripherals, power supply circuitry, and other electronic components commonly used in known computer systems. The data storage devices include an operating system (e.g., Windows NT®, distributed by Microsoft Corporation of Redmond, Wash.) and application programs that may be used by the computer system 10.

Alternative embodiments do not include many of the electronic components 24 noted above. Instead, such embodiments may include components 24 that enable remote computing. In other words, in such embodiments, various computer components noted above, such as the processor, memory, etc . . . are remote from the computer system 10. For example, such components may be a rack located in an isolated, climate controlled room that is remote from the computer system 10. The console 12 thus may include other components 24, such as a power supply and extender technology that communicates with the remotely located computer components. By way of example, the extender technology may be those distributed under the tradename LONGVIEW by Avocent Corp of Huntsville, Ala.

In illustrative embodiments, at least some of the electronic components are contained within a separate housing 24A that itself is contained within the console interior 13. To that end, the side of the console 12 is shown in a cut-away view to schematically show the housing 24A. The housing 24A may be manufactured by any conventional material, such as aluminum or a hardened plastic produced by injection molding processes. The housing 24A and its electronic components may be accessed through a door coupled to the front of the console 12.

The keyboard apparatus 16 includes a keyboard 27 contained within an aluminum reinforced keyboard case 26. The case 26 includes an opening 28 for exposing the keyboard 27. The case preferably is sealed to prevent dust and moisture from entering its interior. In addition, the case 26 includes bolt holes for bolting the case to the console 12. Among others, the keyboard 27 may be a CORTRON keyboard, distributed by Cortron Incorporated of Methuen, Mass.

Instead of isolating the entire computer system 10, only the portion(s) of the computer system 10 that can reasonably benefit from isolation include shock absorbing isolation devices. Stated another way, unlike various noted prior art ruggedized computer systems, illustrative embodiments provide local isolation to portions of the computer system 10. Accordingly, in illustrative embodiments of the invention, the monitor apparatus 14 is secured to the console 12 by means of one or more isolators 30 (also referred to in the art as "shock absorbers" or "shock isolators").

Figure 2:
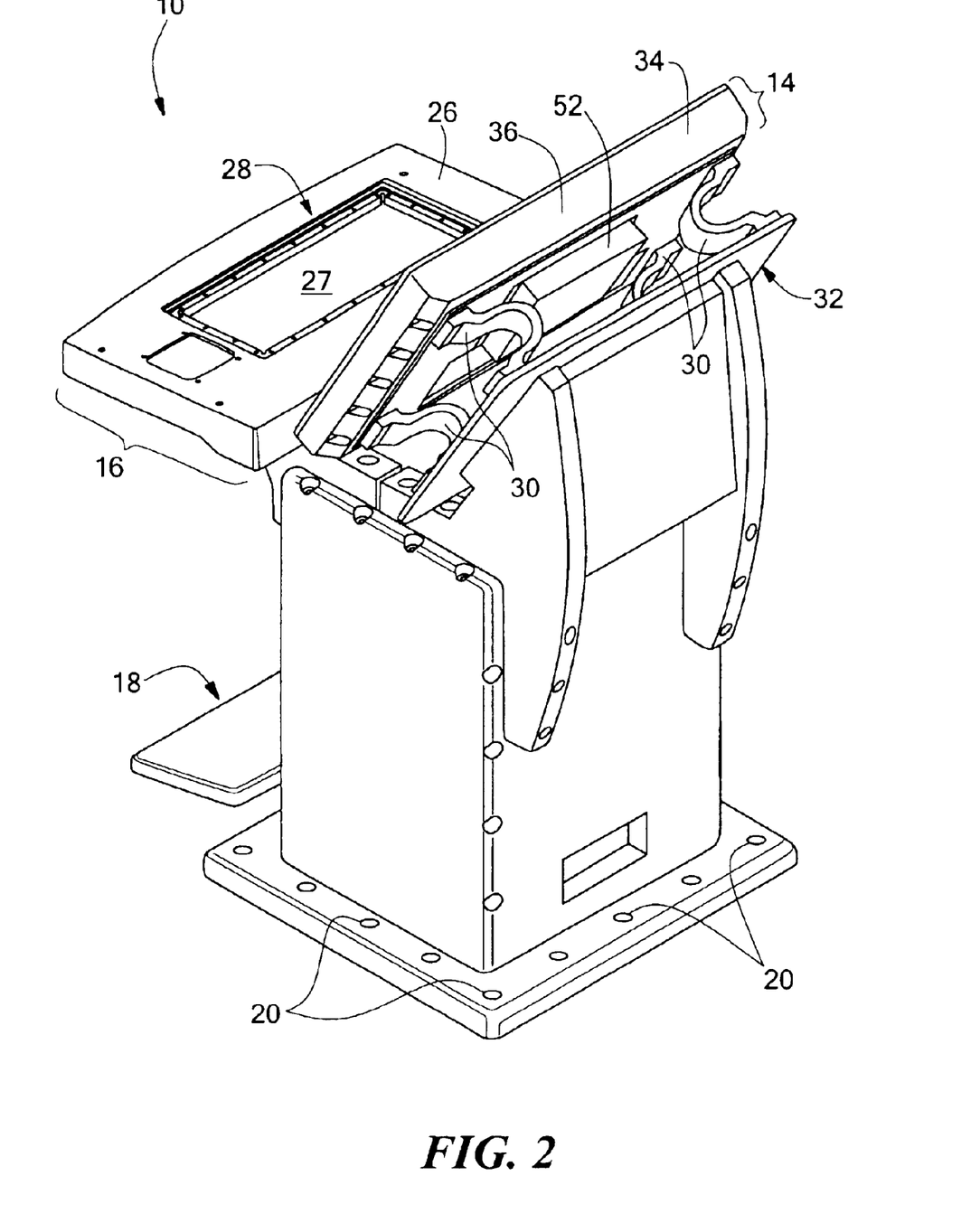
FIG. 2 shows a perspective rear view of the ruggedized computer system shown in FIG. 1.
Figure 3:
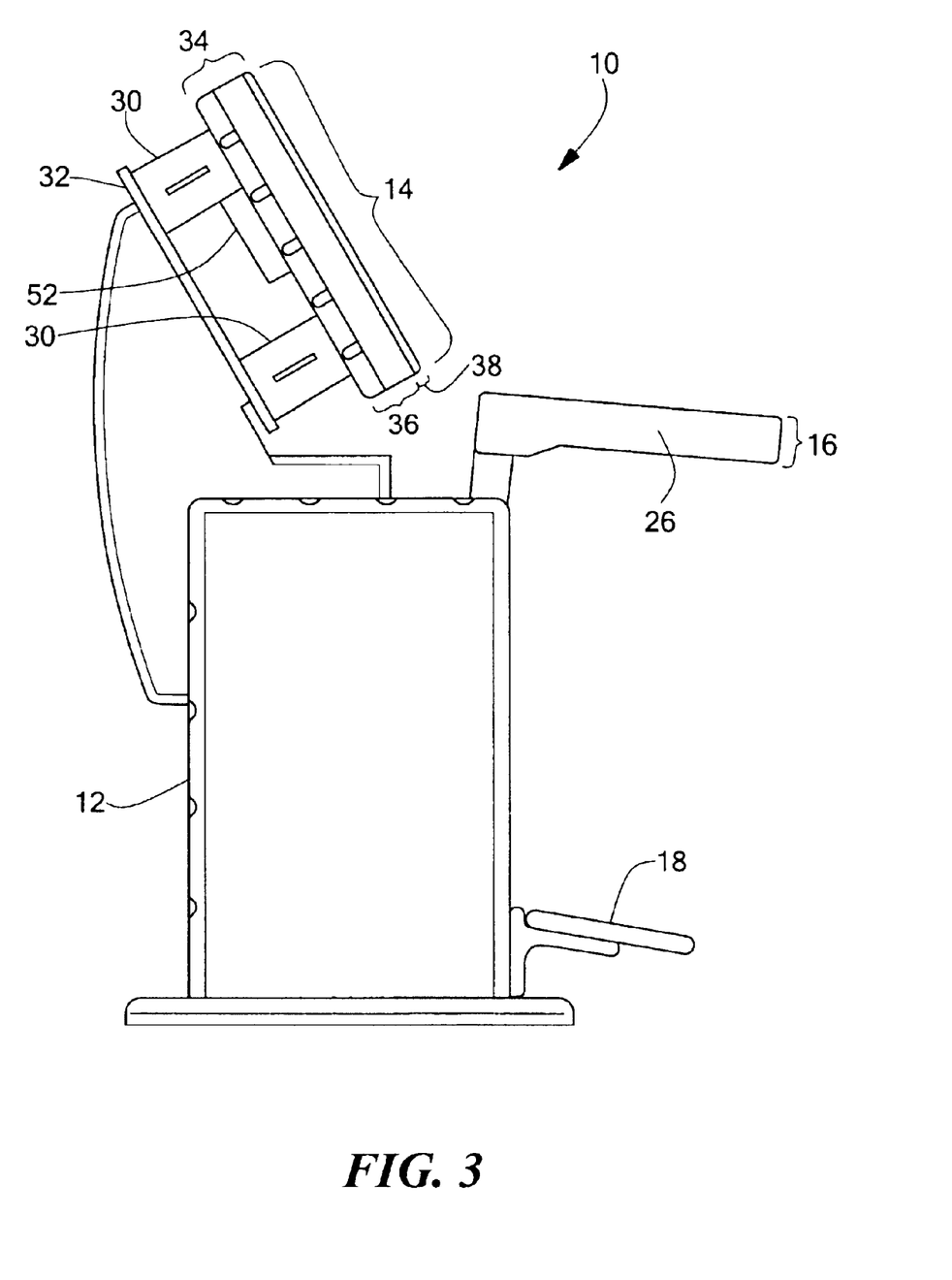
FIG. 3 shows a side view of the ruggedized computer system shown in FIG. 1.

To that end, FIGS. 2 and 3 show one embodiment in which four isolators 30 are coupled between the console 12 and the monitor apparatus 14. More particularly, the console 12 includes a monitor apparatus mounting bracket 32 with a generally planar surface that securely connects with the four isolators 30. In illustrative embodiments, the isolators 30 are selected so that they can mitigate forces of up to about 100 Gs down to forces no greater than about 30 Gs. Accordingly, the monitor apparatus 14 illustratively is designed to withstand forces of up to 30 Gs. Details of the monitor apparatus 14 are discussed below.

Consistent with the localized isolation goals noted above, isolators 30 also are used to minimize forces applied to the housing 24A (having the components 24). In particular, FIG. 1 schematically shows isolators 30 as being connected between the inside walls of the console interior, and the computer housing 24A.

The isolators 30 may be manufactured from any material used for such purposes, such as a hardened rubber. The isolators 30 thus are rated for use with a specified sized monitor apparatus 14 to mitigate/attenuate forces expected in certain types of environments. For example, the isolators 30 may be DTI shock mounts, distributed by Dynamic Testing, Inc. of Rustburg, Va. Of course, other types of isolators 30 may be used. For example, the isolators 30 may be mechanical isolators, or some other type of isolators known in the art. Accordingly, discussion of any specific type of isolators 30 described herein is not intended to limit the scope of various embodiments of the invention.

The monitor apparatus 14 includes a monitor case 34 having an aluminum back portion 36 and a corresponding front portion 38 (see FIGS. 4A, 4B, 5A, and 5B). When connected together, the back and front portions 36 and 38 form a case interior. A conventional display device is mounted within the case interior in a manner that mitigates forces of up to 30 Gs. Details of the mounting process are discussed below with reference to FIG. 6.

In illustrative embodiments, the display device is a liquid crystal display device having a low profile (i.e., also referred to in the art as a "flat panel" display device). For example, the display device may be a 24 inch viewable HDTV-ready WUXGA LCD display, such as one of those types of display devices distributed by Samsung Electronics America Inc., of San Jose, Calif. In addition, the monitor apparatus 14 may have the following attributes:

Wide viewing angle (e.g., about 170 degrees);

Switchable aspect ratio: wide 16:10 format, 5:4 or 4:3

Remote control (OSD and input selection);

Picture-in-picture; picture-by-picture;

Digital zoom to 64 times;

Advanced image scaling;

Inputs including RGB, DVI, Composite, NTSC/PAL/SECAM, S-Video;

Supports for any remote computing platform, such as Intel® and AMD-based computers and operating systems (e.g., UNIX, LINUX, SOLARIS, Microsoft® Windows NT® or Windows 2000®); and Permits viewing of multiple input sources simultaneously (e.g., one input from the computer and another input from some alternate video source).

An experimental monitor apparatus 14 having the above noted attributes weighed about 75 pounds. It should be noted, however, that discussion of a monitor apparatus 14 with these attributes is exemplary and not intended to limit the scope of various embodiments of the invention. Accordingly, those skilled in the art should understand that the embodiments may have other attributes.

In alternative embodiments, the monitor apparatus 14 includes another type of monitor, such as a cathode ray tube. Accordingly, discussion of liquid crystal displays is exemplary of specific embodiments and not intended to limit all embodiments. The terms "display" and "monitor" thus may be used interchangably in this specification.

Figure 4A:
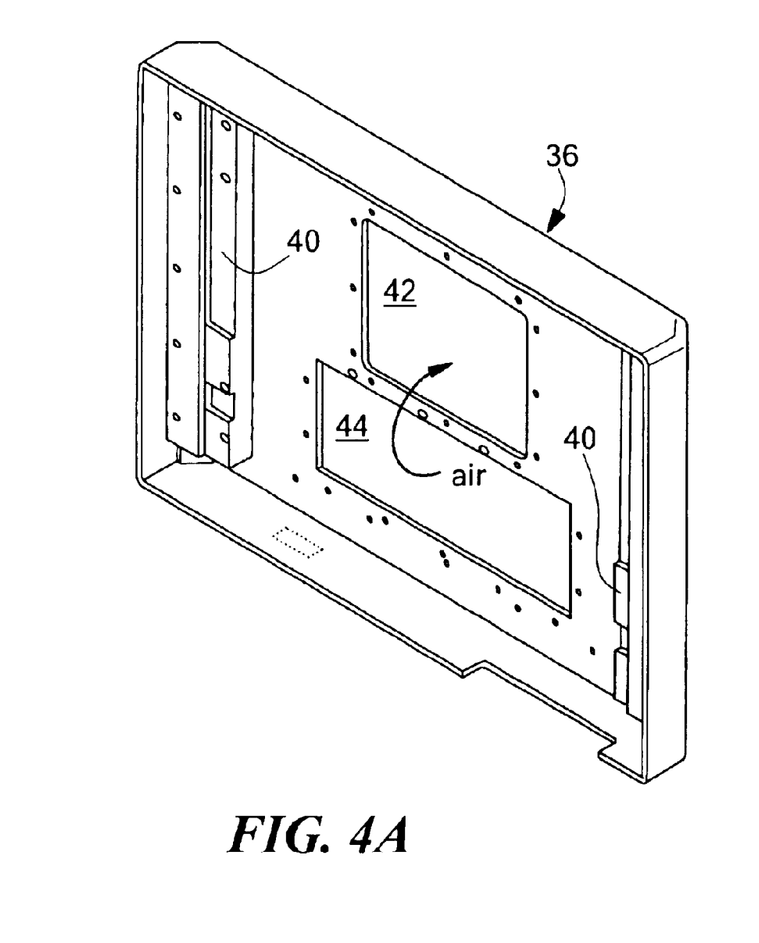
FIG. 4A shows an isometric front view of a back portion of a monitor case configured in accordance with illustrative embodiments of the invention.
Figure 4B:
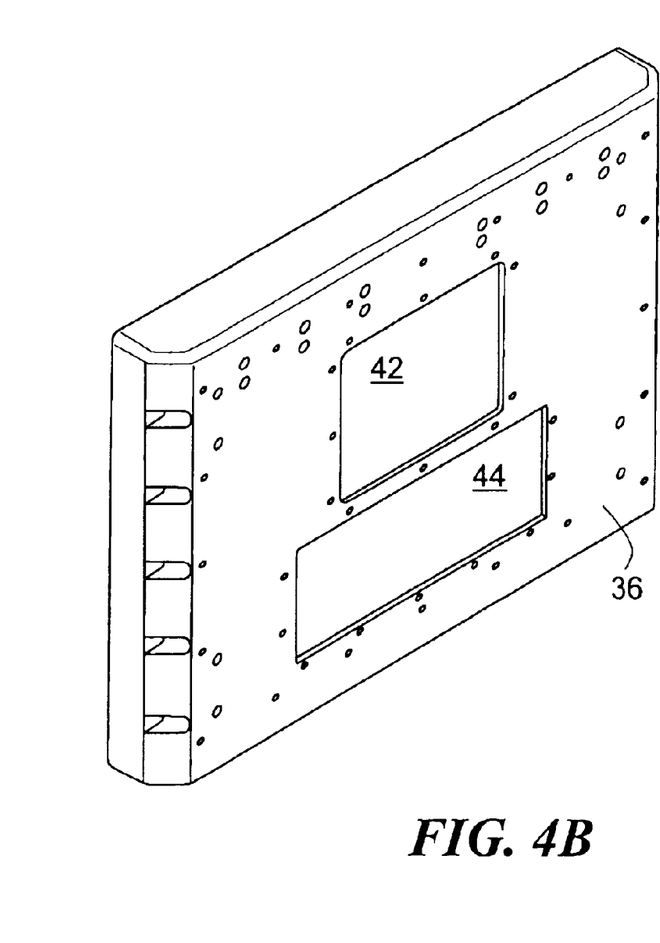
FIG. 4B shows an isometric rear view of the back portion of the monitor case shown in FIG. 4A.
Figure 5A:
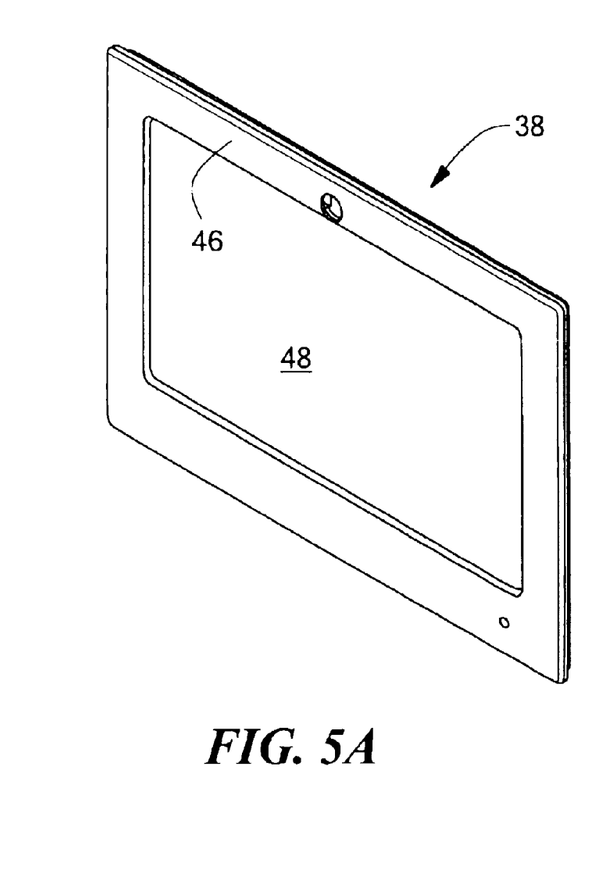
FIG. 5A shows an isometric front view of a front panel of the monitor case.
Figure 5B:
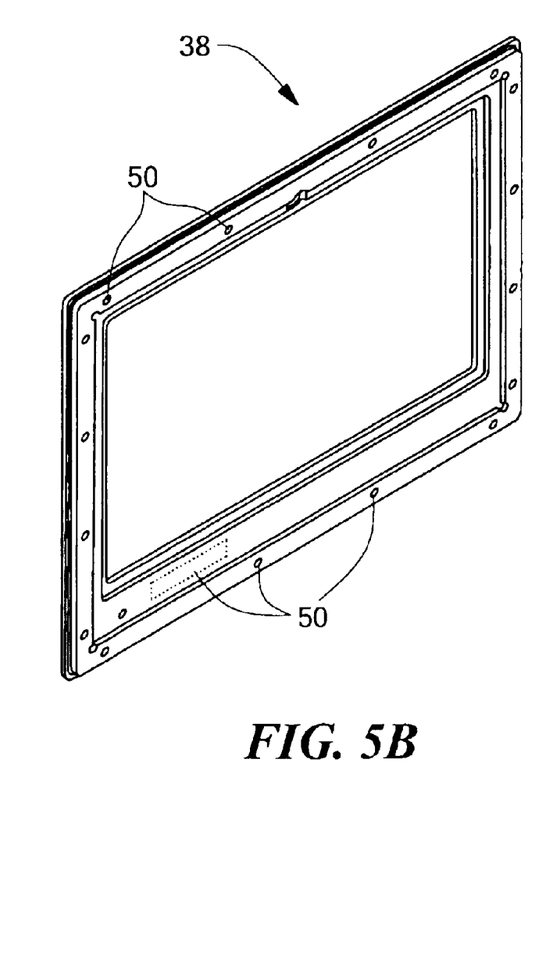
FIG. 5B shows an isometric rear view of the front panel shown in FIG. 5A.

FIGS. 4A and 4B show respective front and rear perspective views of the back portion 36, while FIGS. 5A and 5B show respective front and rear perspective views of the front portion 38. In particular, the back portion 36 of the monitor case 34 includes clamp mounting members 40 that secure clamps with the case interior, an air outlet 42, and an air inlet 44. The front portion 38 includes an aluminum frame 46 that supports a sheet of transparent material 48. In illustrative embodiments, the transparent material 48 is a non-reflective safety glass. The frame 46 also includes screw holes 50 for connecting with the back portion 36.

Figure 6:
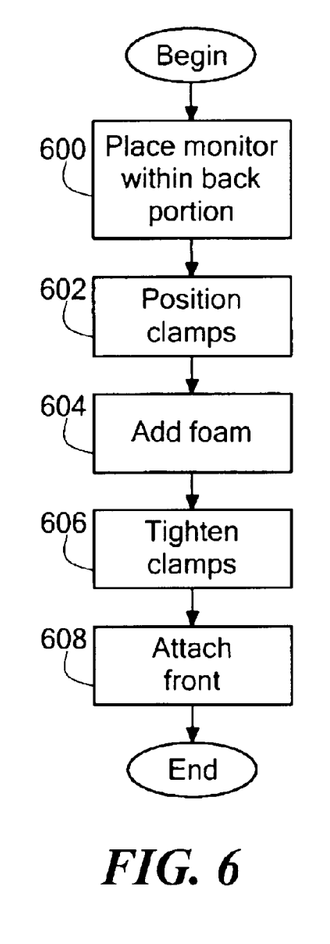
FIG. 6 shows an illustrative process of mounting a liquid crystal display monitor in the monitor case shown in FIGS. 4A, 4B, 5A, and 5B.

FIG. 6 shows an illustrative process of assembling the monitor apparatus 14. The process begins at step 600, in which a liquid crystal display monitor is placed into the back portion 36 of the monitor case 34 so that its back portion 36 faces the air inlet 44 and air outlet 42. The process continues to step 602, in which clamps (not shown) are placed (but not fastened) in appropriate positions along the clamp mounting members 40. Foam then may be added to specific portions of the interior of the monitor apparatus 14 at step 604, and the clamps are tightened at step 606 to secure the monitor in place. In illustrative embodiments, when added (via step 604), foam may be disposed between the clamps and the monitor to ensure no direct contact between the clamps and the monitor. In addition, in such case, foam illustratively may be disposed between the monitor and the top, bottom, and sides of the monitor, and the interior walls of the monitor case 34. No foam, however, is disposed behind the monitor in this embodiment. This ensures proper air flow for cooling the monitor.

After the clamps are tightened, the front portion 38 is coupled with the back portion 36 (step 608), thus completing assembly of the primary monitor apparatus. After the primary monitor apparatus is assembled, a fan 52 (FIG. 3) may be connected over the air outlet 42 in the back portion 36. Any conventional fan designed for cooling electronic components may be used. When the fan 52 is operational, it draws air out of the case interior through the air outlet 42, and draws air into the case interior through the air inlet 44.

Use of a liquid crystal display ("LCD") monitor instead of a CRT monitor has a number of advantages. In particular, an LCD monitor is much lighter than a CRT monitor. Consequently, the console 12 can be much lighter and have a lower profile. This enables more console-type computer systems to be used in a given area.

Isolation is facilitated when the element being isolated is relatively small. Accordingly, use of an LCD monitor enables local component isolation since the LCD monitor, with its monitor case 34, is a much smaller percentage of the total weight of the entire computer system 10 than the percentage of a CRT monitor in a prior art console-type computer system. Stated another way, the percentage of weight of a CRT monitor is a much greater portion of the overall system weight of a prior art system than the percentage of an LCD monitor is with illustrative embodiments. Only portions of the computer system 10 that can benefit from isolation thus are isolated. Accordingly, as discussed above, the monitor apparatus 14 and/or internal electronic components illustratively are isolated, while the rest of the computer system 10 is not isolated. As a result, smaller and less expensive isolators can be used. In addition, installation is simplified since isolation of the entire system is not required. The computer system 10 thus is considered to be pre-installed with isolation. During installation, the computer system 10 simply is bolted to a surface, such as the deck of a ship.

Instead of being a part of a ruggedized computer system as shown in FIGS. 1–3, the monitor apparatus 14, with accompanying isolators 30, may connect to some other structure. For example, the isolators 30 may connect the monitor apparatus 14 with a wall. In such case, the underlying computer system does not structurally support the monitor apparatus 14—the wall provides the structural support. The underlying computer system merely transmits the appropriate image data to the monitor apparatus 14 via some known means, such as through a cabled or wireless technique.

Figure 7A:
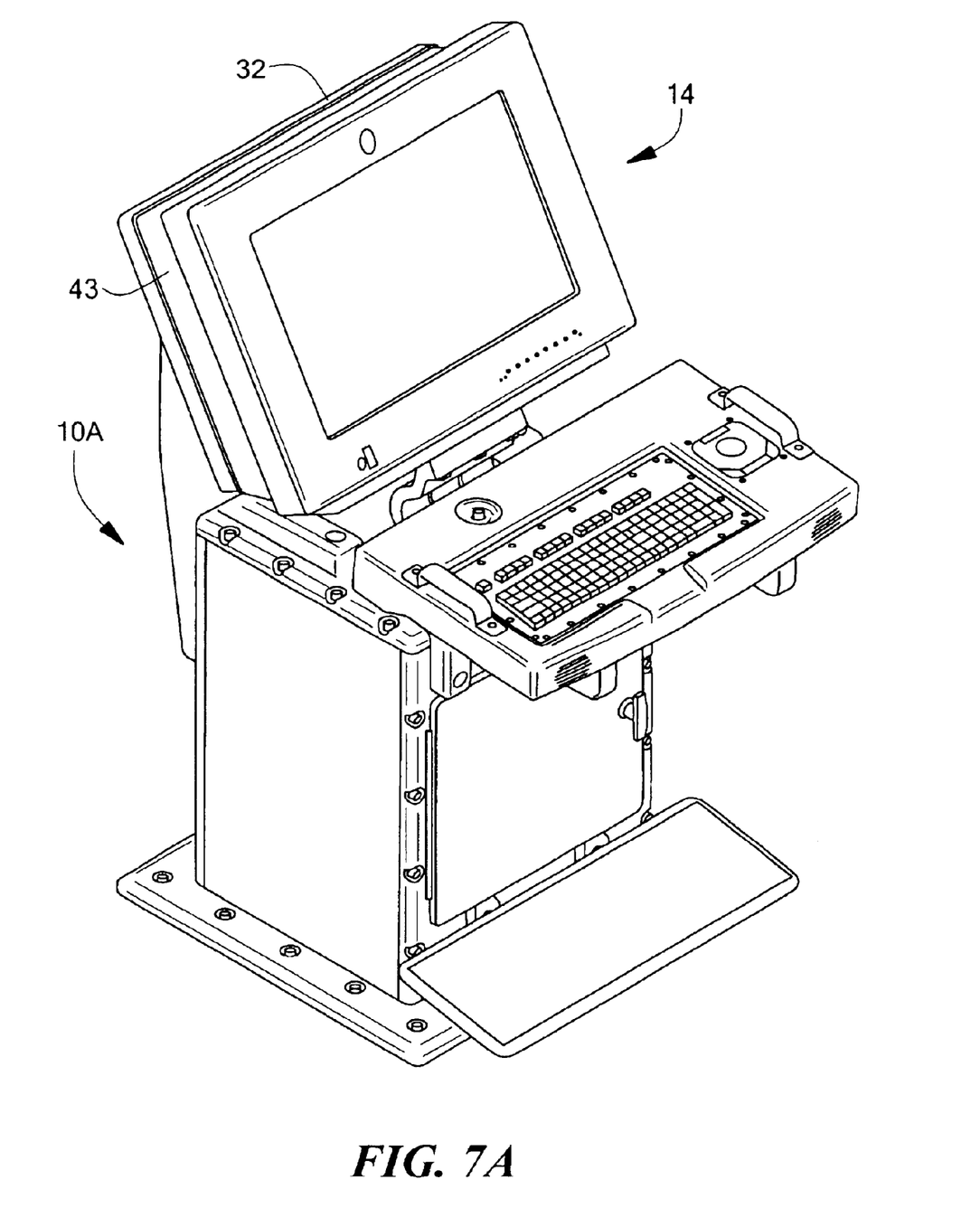
FIG. 7A schematically shows a perspective front view of a ruggedized computer system constructed in accordance with other embodiments of the invention.
Figure 7B:
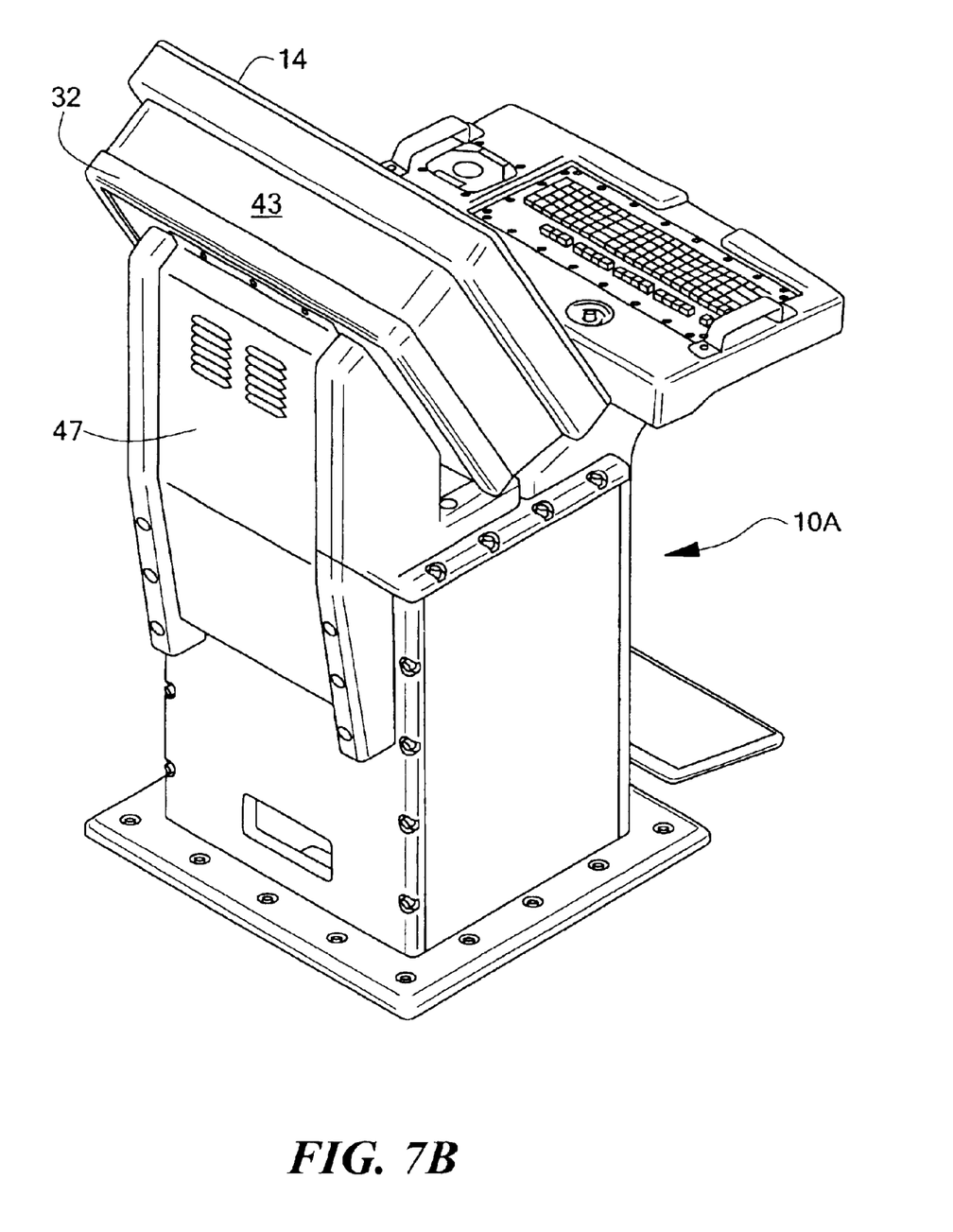
FIG. 7B schematically shows a perspective rear view of the ruggedized computer system shown in FIG. 7A.

FIG. 7A schematically shows a perspective front view of a ruggedized computer system 10A constructed in accordance with other embodiments of the invention. In a similar manner, FIG. 7B schematically shows a perspective rear view of the same ruggedized computer system 10A shown in FIG. 7A. In this embodiment, an exterior boot 43 encloses the space formed between the monitor apparatus 14 and the mounting bracket 32. In a manner similar to other elements of different embodiments, the boot 43 also may be used in other embodiments, such as those shown in FIGS. 1–3. The boot 43, mounting bracket 32 and monitor apparatus 14 thus may be considered to form an interior that includes, among other things, the isolators 30A, 30B, and 30C (shown in FIG. 8).

Figure 8:
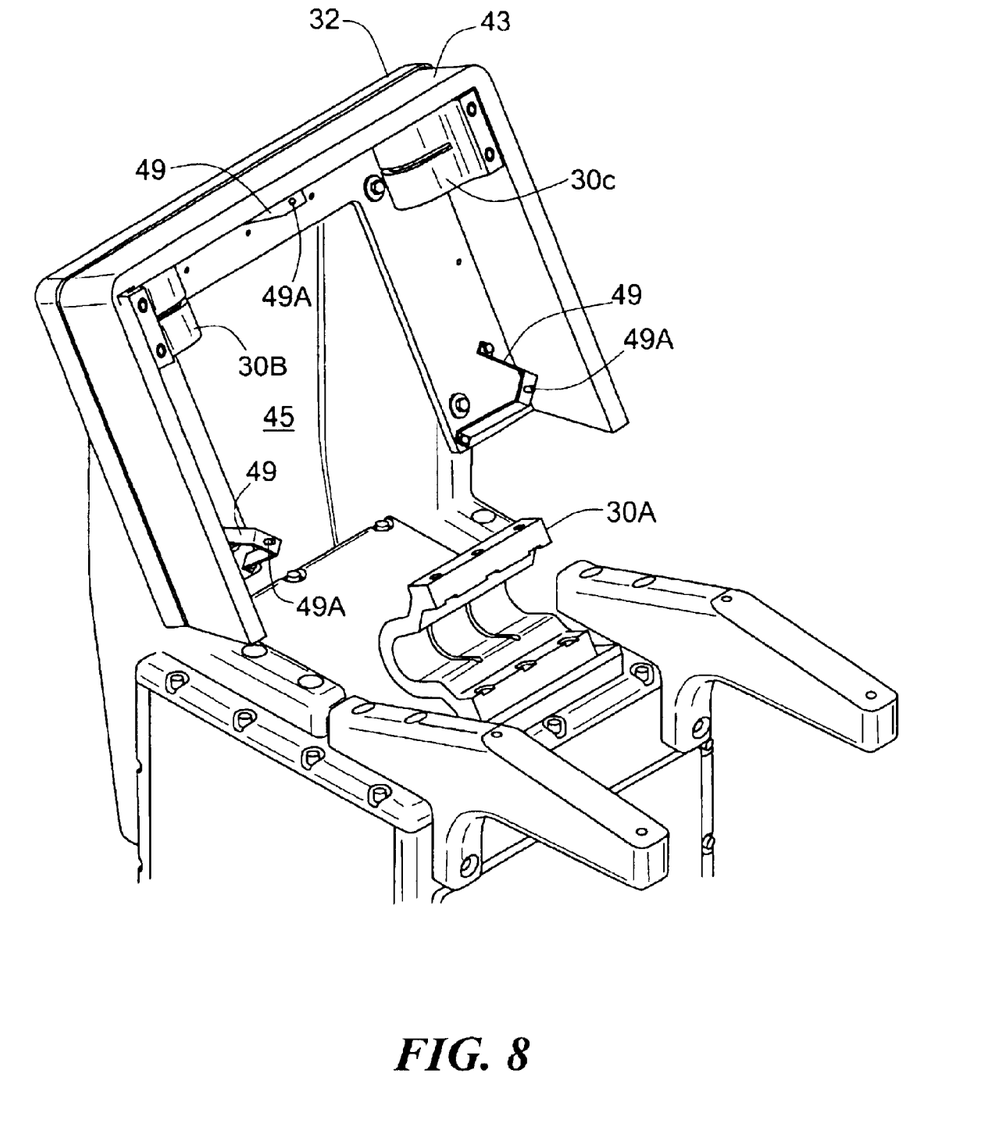
FIG. 8 schematically shows an isometric view of the mounting apparatus for a monitor case of the computer system shown in FIGS. 7A and 7B.

FIG. 8 schematically shows an isometric view of the mounting bracket 32 and isolators 30 of the computer system 10A shown in FIGS. 7A and 7B. Specifically, this embodiment has three isolators 30A, 30B, and 30C instead of four. The three isolators 30A, 30B, and 30C include a lower isolator 30A and two upper isolators 30B and 30C. The lower isolator 30A is coupled to a central point of the bottom surface of the monitor apparatus 30, while the upper isolators 30B and 30C are coupled with the upper corners of the monitor apparatus 30. The mounting bracket 32 forms an opening 45 to which a grating 47 is mounted (see FIG. 7B) for facilitating cooling processes.

FIG. 8 also shows three stabilizers 49 secured to the mounting bracket 32. Specifically, in addition to a primary portion (e.g., manufactured from aluminum) secured to the mounting bracket 32, each stabilizer 49 also has a pin 49A that normally is inserted into mating holes (not shown) on the monitor case 34. This mating should minimize monitor case vibration under normal conditions (i.e., when no high G forces are present). Moreover, the stabilizers 49 illustratively are constructed so their respective pins 49A break when a relatively high force event occurs (e.g., four Gs or greater). Permitting the pins 49A to break enables the isolators 30A–30C to provide their shock attenuation function during a high force event. To these ends, the pins 49A illustratively are manufactured from a low shear factor plastic that permits them to break off during a high force event During testing, a computer system 10 having isolators 30A, 30B, and 30C with the below listed specifications were able to attenuate an approximate 100 G force down to approximately 15 Gs. The specifications for such isolators 30A, 30B, and 30C are as follows:

Lower Isolator 30A:
  Model number DTI-1A-063 x 75-115 DTI-SHOCK™ MOUNT, available from Dynamic Testing, Inc.;
  Bolting: six ½ inch hex head cap screws per mount;
  Static Deflection: 0.4 inches maximum
  Weight Capacity: 70–115 pounds;
  Dynamic Deflection: 4.0 inches maximum in all directions;
  Temperature Range: −30 degrees F. to 150 degrees F;
  Drift: 0.25" maximum drift; and
  Frequency: 5–7 hertz shock with 5–7 hertz vibration.

Upper Isolators 30B and 30C:
  Model number DTI-2A-045 x 38-022 DTI-SHOCK™ MOUNT, available from Dynamic Testing, Inc.;
  Bolting: four ⅜ inch hex head cap screws per mount;
  Static Deflection: 0.2 inches maximum;
  Weight Capacity: 15–22 pounds;
  Dynamic Deflection: 3.0 inches maximum in all directions;
  Temperature Range: −30 degrees F. to 150 degrees F.;
  Drift: 0.1" maximum drift at 150 degrees F.; and
  Frequency: 8–9 hertz shock and 8–9 hertz vibration.

It should be noted that although specific specifications for the isolators 30A, 30B, and 30C are given above, they are exemplary and not intended to limit the scope of the invention. Accordingly, other isolators 30 can be used with different specifications.

Figure 9:
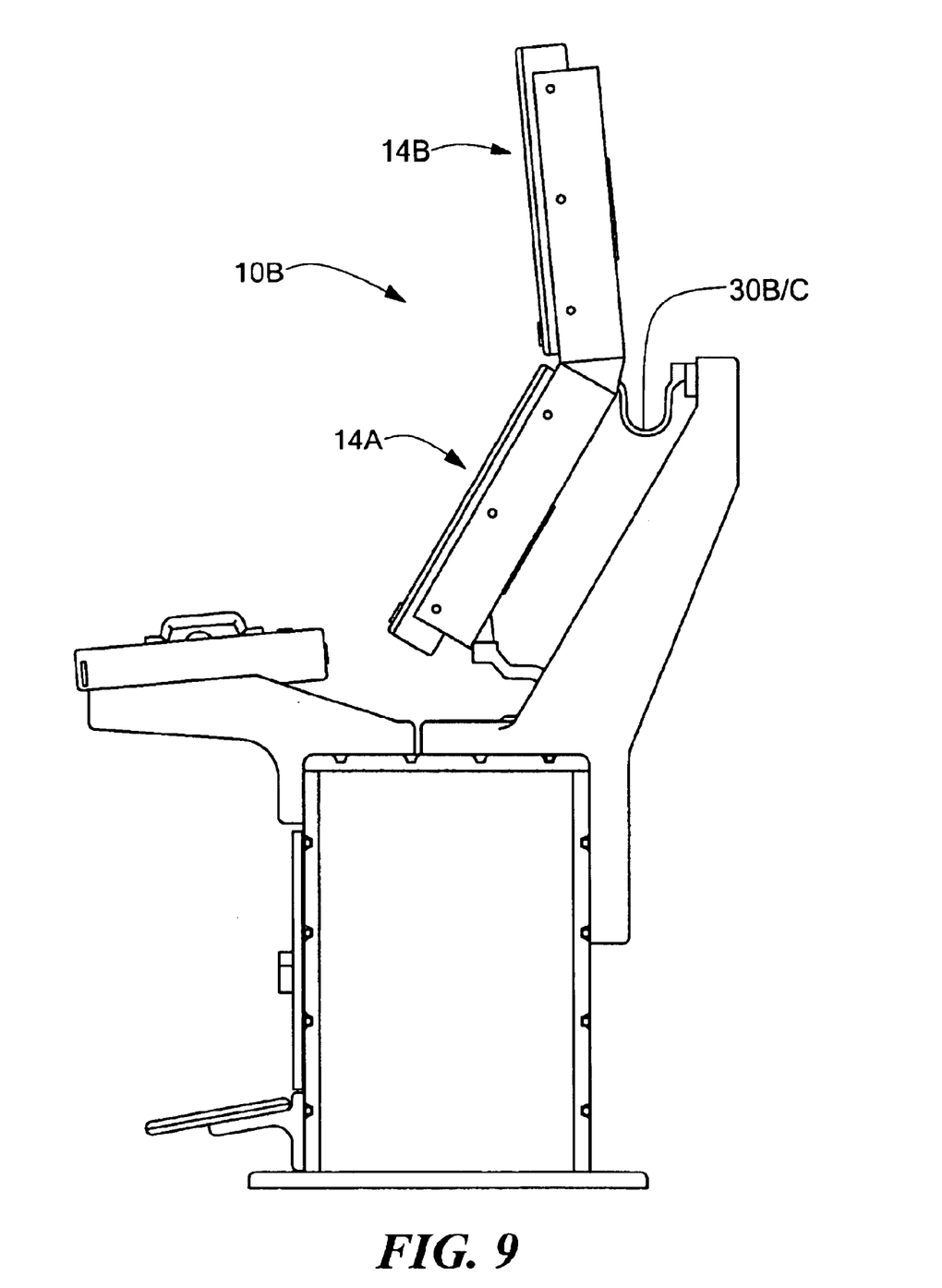
FIG. 9 schematically shows a side view of an exemplary double monitor ruggedized computer system configured in accordance with various embodiments.

FIG. 9 schematically shows an exemplary double monitor ruggedized computer system 10B configured in accordance with various embodiments. In this embodiment, a second monitor apparatus 14B is mounted to the existing monitor apparatus 14A. Shock absorption still is controlled by the isolation system used by the lower monitor apparatus 14A. In other embodiments of the system of FIG. 10B, isolators also may be used with the second monitor apparatus 14B.

Although various exemplary embodiments of the invention are disclosed below, it should be apparent to those skilled in the art that various changes and modifications can be made that will achieve some of the advantages of the invention without departing from the true scope of the invention.

What is claimed is:

1. A console-type ruggedized computer system comprising:
  a console having components, the console also having an external perimeter;
  a image producing apparatus for displaying images based upon electronic signals received from the components of the console; and
  at least one shock absorber coupling the image producing apparatus to the external perimeter of the console, the at least one shock absorber being capable of attenuating shock to the image producing apparatus.

2. The computer system as defined by claim 1 wherein the components includes computer hardware that forwards the images to the image producing apparatus, the computer hardware including at least one of a processor, memory, extender, and a bus system.

3. The computer system as defined by claim 1 wherein the image producing apparatus includes a metallic case containing a liquid crystal display device.

4. The computer system as defined by claim 1 wherein the console is metallic.

5. The computer system as defined by claim 1 wherein the at least one shock absorber is manufactured from a hardened rubber material.

6. The computer system as defined by claim 1 wherein the image producing apparatus weighs no more than about 75 pounds.

7. The computer system as defined by claim 1 wherein the image producing apparatus includes a case forming a case interior, a monitor within the case interior, and a fan coupled with the case, the fan being capable of generating air flow within the case interior to reduce the temperature within the case interior when the monitor is energized.

8. A console-type ruggedized computer system comprising:
  a console having components, the console also having an external perimeter;
  a image producing apparatus for displaying images based upon electronic signals received from the components of the console; and
  means for attenuating shock to the image producing apparatus, the shock attenuating means coupling the image producing apparatus to the external perimeter of the console.

9. The computer system as defined by claim 8 wherein the components includes computer hardware that forwards the images to the image producing apparatus, the computer hardware including at least one of a processor, memory, extender, and a bus system.

10. The computer system as defined by claim 8 wherein the image producing apparatus includes a metallic case containing a liquid crystal display device.

11. The computer system as defined by claim 8 wherein the console is metallic.

12. The computer system as defined by claim 8 wherein the shock attenuating means is manufactured from a hardened rubber material.

13. The computer system as defined by claim 8 wherein the image producing apparatus weighs no more than about 75 pounds.

14. The computer system as defined by claim 8 wherein the image producing apparatus includes a case forming a case interior, a monitor within the case interior, and a fan coupled with the case, the fan being capable of generating air flow within the case interior to reduce the temperature within the case interior when the monitor is energized.

\* \* \* \* \*